(12) United States Patent
Misra et al.

(10) Patent No.: US 8,473,604 B2
(45) Date of Patent: Jun. 25, 2013

(54) METHOD FOR INTELLIGENT AND AUTOMATED TRANSMISSION OF LOCAL CONTEXT IN CONVERGED SIGNALING

(75) Inventors: Archan Misra, Irvington, NY (US); Edith Helen Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 12/144,552

(22) Filed: Jun. 23, 2008

(65) Prior Publication Data

US 2008/0285738 A1 Nov. 20, 2008

Related U.S. Application Data

(63) Continuation of application No. 11/333,921, filed on Jan. 18, 2006, now abandoned.

(51) Int. Cl.
G06F 15/173 (2006.01)

(52) U.S. Cl.
USPC ............... 709/224; 379/266.01; 379/265.09; 717/128; 725/37

(58) Field of Classification Search
USPC ............ 709/227; 379/265.09, 266.01; 725/37
See application file for complete search history.

(56) References Cited

U.S. PATENT DOCUMENTS

| | | | |
|---|---|---|---|
| 5,724,406 A | 3/1998 | Juster | |
| 6,615,240 B1 | 9/2003 | Sullivan et al. | |
| 7,010,593 B2 * | 3/2006 | Raymond | 709/224 |
| 2002/0073203 A1 | 6/2002 | Gilleland | |
| 2002/0087949 A1 | 7/2002 | Golender et al. | |
| 2002/0116516 A1 | 8/2002 | Pedersen et al. | |
| 2003/0112941 A1 | 6/2003 | Brown et al. | |
| 2003/0112956 A1 | 6/2003 | Brown et al. | |
| 2003/0161448 A1 | 8/2003 | Parolkar et al. | |
| 2004/0123242 A1 | 6/2004 | McKibben et al. | |
| 2004/0268314 A1 * | 12/2004 | Kollman et al. | 717/128 |
| 2006/0075306 A1 | 4/2006 | Chandrasekaren | |
| 2006/0153357 A1 * | 7/2006 | Acharya et al. | 379/266.01 |
| 2007/0162929 A1 * | 7/2007 | Mickle et al. | 725/37 |

* cited by examiner

*Primary Examiner* — Kyung H Shin
(74) *Attorney, Agent, or Firm* — August Law, LLC; George Willinghan (57) ABSTRACT

Methods and systems are provided for associating contextual data with communication sessions, in particular in technical help desk scenarios. A context logger service running on a central server or on an individual computing device is used to create a log of application specific, often ephemeral, contextual data for a plurality of applications running one or more systems that are in communication with the context logger service across one or more networks. When a communication session between an initiating entity and a receiving entity to request assistance regarding a subject application running on one of the systems is initiated, and if the communication session is deemed to be a candidate for the automatic association of such context data, at least a portion of the application specific contextual data contained in the log is associated with the communication session and delivered to the receiving entity. The receiving entity uses the associated application specific contextual data to provide the requested assistance, or otherwise improve the operations at the receiving entity.

35 Claims, 5 Drawing Sheets

METHOD FOR INTELLIGENT AND AUTOMATED TRANSMISSION OF LOCAL CONTEXT IN CONVERGED SIGNALING

CROSS-REFERENCE TO RELATED APPLICATIONS

The present application is a continuation of co-pending U.S. application Ser. No. 11/333,921, filed Jan. 18, 2006. The entire disclosure of that application is incorporated herein by reference.

FIELD OF THE INVENTION

The present invention is directed to the field of computer networks. More specifically, the present invention is directed to automated computer support services and in particular session initiation protocol help sessions.

BACKGROUND OF THE INVENTION

Enterprises handle a large volume of phone calls from clients or customers, both external and internal. To facilitate the processing of this large volume of phone calls, many businesses utilize technologies such as call centers and automated call routing equipment. In general, each call center contains the equipment and personnel necessary to manage and to process a large volume of inbound or outbound calls. Inbound call centers provide support for incoming sales and for customer service requests, including technical assistance related to hardware and software problems encountered by the customer on their computing platform.

The problems associated with call routing inbound calls increase as the customer service functions are divided and distributed among an increasing number of departments and representatives. To provide automated routing of the customer's call request to the appropriate service department or representative, call centers typically contain an automatic call distributor (ACD) to handle incoming calls and to provide the desired routing. For example, the ACD connects calls to a sales representative, a customer service representative or a help desk operator, among others. The ACD also facilitates automated routing of incoming calls to prompt the caller to select one or more menu choices and to place calls that cannot be answered immediately into a hold queue until the next appropriate agent becomes available.

The routing and queuing provided by the ACD were historically handled by a live human operator. For example, a customer would call a customer service number and would be connected with the live operator, who would determine the customer's needs and then route the call accordingly.

The use of ACD has provided companies with a more efficient method of handling and distributing incoming customer requests, particularly as the number of these requests grows. In general, ACD systems prompt callers through a multitude of levels of menus. Recent technological advances also provide for the use of voice recognition systems to facilitate customer routing and menu selection. These systems, however, do not eliminate the need to progress through various menus levels. In addition, voice recognition systems provide additional problems, including an inability to understand all spoken responses. With these limitations, ACD's can create a customer service interface that is slow and frustrating and that produces a negative response in customers, which is not a desired reaction for purposes of customer service.

In networked computer systems, customers contact information technology help desks to request technical assistance with applications running on various systems within the networked computer system and with network related issues. Assistance is obtained using over the telephone, via E-mail or using web-based help. When support personnel are contacted (with an ACD being used to route the incoming call to the appropriate support person), information is then gathered from the customer, typically regarding the technical issue for which assistance is requested and other general information that is necessary to provide the assistance, i.e. software version, operating system, error messages. The support personnel may also request additional information about the context in which the technical problem occurs. Such context may include the set of URL's, i.e. Web sites, that the customer has recently visited with a browser, the set of recent patches downloaded for a specific application or even the properties, e.g. the owner or modification date, of a recent document opened by an application. In many instances, such context information, especially related to recent actions, may pinpoint the likely cause of the error or configuration problem. This information is concurrently transcribed by support personnel and can be associated with a specific help desk inquiry, for example by assigning a trouble ticket number.

The process of transcribing, however, is time consuming and relies on the support personnel to provide a full and adequate transcription of the information that is provided by the customer. In addition, the customer may be asked to repeat information as the call is routed or elevated through the call center. Moreover, in many instances, the customer is not completely aware of the recent context of the specific application, e.g., the customer many not remember accessing a particular website or downloading a music file three days ago, and would thus be unable to provide a complete and accurate picture of the recent activity on that computer or with that application. The information that is provided by the customer may ultimately be superfluous.

A help desk system is needed that would provide the necessary technical information to help desk personnel without the need for customer prompted input. The needed technical information about the recent context or activity state of the user or the application would be used not only to speed the ultimate resolution of the assistance request by particular helpdesk personnel, but possibly also to improve the call routing features of the ACD based on the additional metadata about the requestor's contextual history. Suitable systems would leverage the existing network infrastructure including taking advantage of the existing data and communication infrastructure of networked systems to provide diagnostic and contextual information that can be used provide the requested technical assistance. In particular, that availability of such context data may be especially useful in future converged network environments where the means of seeking assistance, e.g. a Voice over Internet Protocol phone call or an instant messaging session, are located on the same device as the application for which the used is seeking assistance.

SUMMARY OF THE INVENTION

The present invention is directed to systems and methods that automatically transport the contextual history of a computer application or a history of recent tasks executed by a user to a help desk at the time a call is initiated to the help desk. This contextual history is transferred either for all outgoing calls or for calls to specially designated help numbers or more generally to specially designated identifiersor for all outgoing calls specifying a general attribute-based criterion, e.g. marked with a designated bit. The contextual history can be used for both intelligent handling and routing of the call, e.g. call to role or route based upon expertise, as well as for making the help desk personnel more efficient by providing the appropriate data and history of related actions that are required to diagnose and solve the technical problem.

In one embodiment, the desired information is stored in one or more logs or databases. Each application running on a system is in communication with the logs through one or more networks. In another embodiment, the log is maintained locally on the requestor's computer or computing platform and is used to capture the contextual history of the user's or requestor's activity on that computer. Using an appropriate application programming interface, the applications write application specific contextual data to the log. When a communication session is initiated between an initiating entity, e.g. a customer or system administrator, and a receiving entity, e.g. a help desk support person, this repository of application specific contextual data is automatically mined for application specific data that is relevant to the application for which assistance is being requested, the initiating entity and the receiving entity.

The relevant data are retrieved from the log and delivered to the receiving entity, for example by appending the data to a session initiation protocol signaling message in an extensible markup language document. The help desk person can view the data, and the data are used to provide the technical assistance that has been requested by the initiating entity. Non-relevant information or information that has not been used or accessed recently is not read from the log, nor delivered to the receiving entity. In addition, the log may expunge or delete records in accordance with pre-defined parameters to keep the data in the log relevant and timely.

In general, the attachment and delivery of application specific contextual data occurs automatically as part of a service that is common to the entire network, as opposed to being derived from specific logic embedded in a single application such as in found in smart phones. In one embodiment, the common context appending component first provides a specific application interface by which applications or users may register specific identifiers as "help numbers", thereby indicating that communications directed to these identifiers, e.g. a phone call to a phone number, are to be enhanced with the automated addition of relevant contextual information. This registration can be performed by an individual user or may be automated through the use of special markup tags in individual applications or modules such that the inclusion of an appropriate markup tag implicitly designates the called identifier as a "help number". The context appending component is then responsible for intercepting the calls to these designated numbers, retrieving the appropriate contextual data from the log and delivering the data to the receiving entity.

The packaging and delivering of the relevant application specific contextual data can take advantage of the communication or signaling infrastructure in use in the network. The data can be sent as a separate or distinct communication session that is related to the help desk call. In accordance with embodiments of the present invention, the terms "call" and "session" can be used interchangeably to denote that in computing environments voice calls are one form of synchronous or collaborative communication sessions an that other alternative formats, for example instant messaging (IM) and video conferencing, can also be used. For example, the relevant portion of the application specific contextual data that was obtained from the log can be sent as an IM or E-mail message to the help desk person along with the actual support desk session establishment request. Alternatively, the relevant data are appended to the signaling messages of the voice call, for example if the user is attempting to initiate a voice-based help session based on a voice over internet protocol (VoIP) setting, or are appended to the messages exchanged in an instant messaging support interface. In general, the contextual information is translated or transcoded into different formats depending on the type of communication session that has been initiated and the prescribed delivery mechanism of the relevant data. This contextual information may, for example, be specified in one format during the call initiation to enable the ACD to better route the call and in a different format after session establishment to enable the help desk personnel navigate or otherwise use the context information for better, more informed assistance.

DETAILED DESCRIPTION

Figure 1:
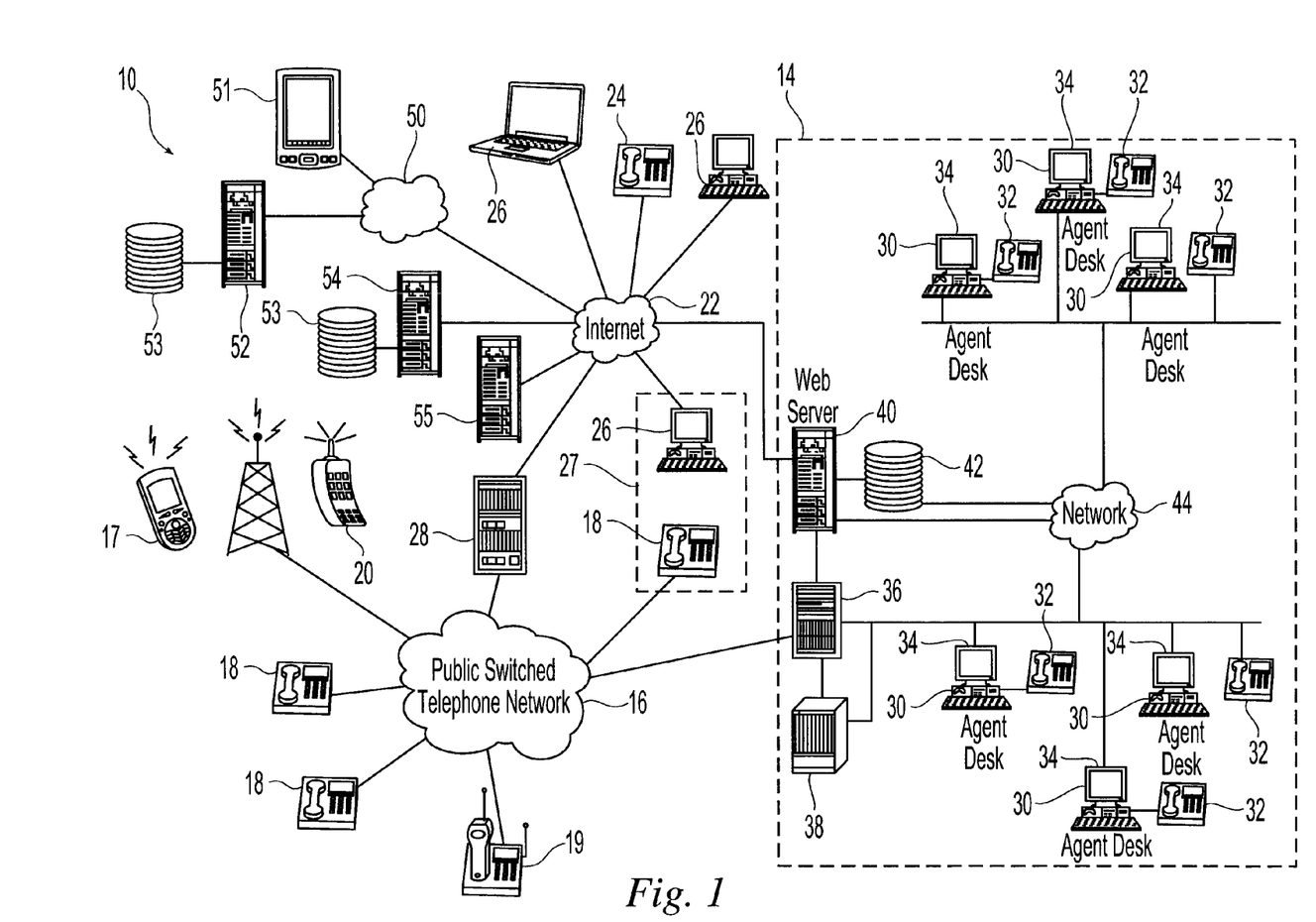
FIG. 1 is a schematic representation of an embodiment of system for associating contextual data with a communication session in accordance with the present invention.

Referring initially to FIG. 1, an exemplary embodiment of a system for associating contextual data with communication sessions 10 in accordance with the present invention is illustrated. The system 10 includes at least one context logger service (CLOGS), for example running on at least one context logger server 54, that is utilized by each one of a plurality of applications to log contextual data specific to that application and for the systems, i.e. computing platforms, on which the computer applications are running to log their system registry information. In one embodiment, each CLOGS runs on an individual or self-contained computing platform, such as a laptop computer, personal digital assistant (PDA) or desktop computer, that is running one or more computer applications. In this preferred embodiment, a single CLOGS is provided that captures contextual data for all of the computer applications running on the computing platform on which the CLOGS is resident. In another embodiment, a separate CLOGS is provided for each application running on a given computing platform. In this embodiment, the CLOGS can be provided by modifying or appending the computer executable code of the computer application. In another embodiment, the CLOGS is running on one or more centralized context logger servers that are each in communication with one or more computing platforms. In this embodiment, the CLOGS can be provided as a separate routine or computer executable code that is resident on and executed by the centralized context logger server. Each centralized CLOGS is capable of providing contextual data capture and storage for a multiplicity of computer applications running on the computing platforms that are in communication with the context logger server on which a given CLOGS is resident. In one embodiment, a plurality of context logger servers is provided, each running a context logger service and serving one or more computing platforms running one or more computer applications. In another embodiment, a common, generally centralized context logger server is provided that is in communication with each computing platform running computer applications for which contextual data capture and storage is desired. Suitable languages for the computer executable code of the CLOGS include any language known and available in the art.

Each context logger server, and hence the CLOGS, is in communication with each computing platform either directly or across one or more networks including wide area networks such as the internet 22 and local area networks 50. Suitable networks 22,50 include local area networks such as Ethernet networks, wide area networks, secure local and wide area networks, secure wireless networks, enterprise-wide networks, storage area networks, virtual private networks, secure virtual private networks, internet area networks, internet secure networks, personal area networks and combinations thereof. In addition, each context logger server is in communication with one or more databases 53 for holding the logs that contain the application specific contextual data and system registry information. In an embodiment with a common centralized context logger server, a single database 53 is provided in communication with the server to hold at least one log capable of storing application specific contextual data for each one of the plurality of computer applications. In another embodiment, a CLOGS is provided on each computing platform, and a separate database or memory location for holding the log is provided on each computing platform. For example, the memory location can be a portion of the memory associated with the computing platform.

As used herein, a computer application or application refers to any complete, self-contained program that is generally expressed as software and executable on a computer or other logical processor and that performs a specified function directly for one or more users. Suitable computer applications can be run on a single, stand alone computing platform or in a network arrangement. As used herein, computing platforms include computers and other logical processing units that are capable of reading and executing the computer readable code in which the computer applications are expressed. Examples of the computing platforms include, but are not limited to, computer systems 26 such as desktops, laptops, mainframe and multimedia computer systems, personal digital assistants (PDA's) 51 and smart phones 17. Each computing platform can be viewed as being associated with a user.

In order to facilitate the writing of the contextual data to the log by each computer application, each CLOGS includes an application program interface (API). Suitable API's are known and available in the art. In an embodiment with a common centralized context logger server and a single database 53 containing a single application specific contextual log and system registry, a single, common API is provided for use by all of the computer applications in communication with the CLOGS. In general, the API facilitates the writing of relevant, important or recent actions associated with a computer application to the log. The CLOGS, unlike a mere registry, stores and maintains records in the log in accordance with pre-defined or user-defined creation and maintenance parameters. Therefore, records can be deleted or expunged upon the expiration of a specified period of time or upon the occurrence of a specified event, i.e. a download of data from the log.

Application users, for example customers and network administrators, access and utilize computer applications running on one or more computing platforms. These computing platforms include, but are not limited to, computer systems 26 such as desktops, laptops, mainframe and multimedia computer systems, personal digital assistants (PDA's) 51 and smart phones 17. Each system is in contact with the internet 22 either directly or through one or more local area networks 50. Computing platforms in communication with a local area network 50 can be viewed as being part of a common domain containing a plurality of computing platforms or systems. In one embodiment a dedicated CLOGS and an associated log or database is provided for a given common domain, and where applicable, a context logger server is contained within that domain. Each one of the computing platforms within that domain writes its system registry information to the log, and each computer application running on the computing platforms within the domain writes its application specific contextual data to the log using the provided API.

When technical support or any other type of assistance is required for a given computer application, users contact an appropriate call center 14. In one embodiment, the call center is contacted through the internet 22 using voice over internet protocol (VoIP) enabled phones 24, PDA's 27 or multimedia computer systems 26, including desktop systems and laptop systems as the customer premises equipment (CPE). This can be accomplished by selecting either a hardware button, i.e. a function key on the keyboard, or a sequence of hardware buttons, i.e. a phone number using the keypad on the keyboard. Alternatively, a software button displayed within the application or on a webpage is selected, for example using a point and click device. Contacting the call center initiates a communication session between the users, i.e. the initiating entities, and the call center, i.e. the receiving entity.

Alternatively, users contact the call center through the public switched telephone network (PSTN) 16 using, for example, conventional wireline phones 18, smart phones 17, cellular phones 20 or wireless phones 19 as the CPE. As used herein, smart phones are generally handheld devices that provide for the transmission of text data and voice data in the same device. The ability to send and receive text data provides the smart phone with added functionalities including, but not limited to, the ability to send or receive electronic mail, the ability to conduct instant messaging (IM) sessions, the ability to view internet pages or web sites and the ability to function as a personal digital assistant (PDA). The system 10 also includes an internet protocol (IP) PSTN gateway 28 as an interface between the PSTN 16 and the internet 22. Phone calls initiated in the PSTN can be routed through the internet to the call center or can be routed directly through the PSTN to an automatic call distributor (ACD) 36 located in the call center 14.

The call center 14 includes a plurality of agents, operators, specialists, support staff or customer service representatives, referred to generally as customer service representatives or agents 30. Either the call center itself or an individual agent can be viewed as the receiving entity of a communication session. Each customer service representative 30 is provided with equipment to handle both the audio portion of a communication session or telephone call and a data portion in which application specific contextual data and system registry information related to the communication session are delivered to the receiving entity, made available to the receiving entity and, if desired, processed by the receiving entity as appropriate. The data can be made available to the receiving entity in any suitable form including as raw data log file, as data that have been transformed or placed in another format or as data that have been analyzed and displayed as the results of this analysis. As illustrated, each agent 30 includes a telephone 32 and a computer 34. Although illustrated as separate equipment, the functions of the telephone 32 and computer 34 can be combined into a single piece of equipment, for example an integrated computing device. The agents 30 within the call center 14 can be located at a single geographical location or can be located at two or more distinct physical locations. The location and arrangement of the agents 30 are transparent to the initiating entities or callers.

The call center 14 includes the ACD 36 to handle and to route the incoming calls through the call center 14. In one embodiment, the call center 14 also includes a private branch exchange (PBX) 38 through which the ACD 36 lines can be routed to provide general carrier interface support for the call center 14. Although illustrated as two distinct pieces of equipment, a combined ACD/PBX can also be used. Direct interface with the PSTN 16 is provided by the ACD 36. Interface with the internet is provided through a web server 40. One or more databases 42 are provided to store information needed by the agents including, but not limited to, technical support information, customer information, parts lists and price lists. Each database 42 can also include computer-executable code for running methods in accordance with the present invention. Agents 30, the ACD 36, the PBX 38, the web server 40 and the database 42 are in communication across one or more networks 44. Suitable networks 44 include, but are not limited to, local area networks such as Ethernet networks, wide area networks, secure local and wide area networks, secure wireless networks, enterprise-wide networks, storage area networks, virtual private networks, secure virtual private networks, internet area networks, internet secure networks, personal area networks and combinations thereof. The telephones 32 located at each agent 30 can be in direct communication with the network 44 or can be in communication with the network 44 through the computer 34.

In one embodiment, the system includes a Context Appending Component (CAC) to identify communication sessions from initiating entities to receiving entities that are help desk, technical help or customer service sessions and to append relevant contextual data, and if desired system registry information, to the identified communication sessions. Suitable languages for the computer-executable code embodying the CAC are known and available in the art. In one embodiment, a CAC is provided on each one of a plurality of computing systems running one or more computer applications. Alternatively, the CAC is located on one or more servers, for example the context logger servers, that are in communication with the computing systems. A separate CAC can also be provided for one or more domains containing a plurality of computing systems. In one embodiment, the CAC is provided as an enhancement or extension of existing call management software or communication or call processing stacks located, for example, on the initiating entity's computing platform. Examples of communication or call processing stacks include, but are not limited to, communications protocols that implement the Open System Interconnection (OSI) stack model of communications including LAN protocols, WAN protocols, network protocols and routing protocols. In one embodiment, the call processing stack is a session initiation protocol (SIP) software stack. Other call processing stacks provide an interface between telephones and other communication networks and include layers such as call processing managers, telephony channel managers, telephony front end layers, external telephony networks and hardware layers. In one embodiment, the CAC is implemented as a modification of one or more of these layers. Alternatively, the CAC is provided as a separate or independent layer outside of any existing communication stack. In one embodiment, all initiated communication sessions are routed through the CAC layer before being passed through the communication processing stack. Alternatively, the CAC layer is structured to monitor the flow of communication sessions to the communication processing stacks and to intercept communication sessions that are identified as being associated with customer service functions. Therefore, the CAC can be embodied as software resident on the originating entity's calling device or can be positioned as a part of the call routing software, e.g. a proxy, located in a network.

In one embodiment, the CAC intercepts outgoing communication sessions or calls and determines if a particular communication session is directed towards designated helpline numbers. Alternatively, the CAC only intercepts outgoing communication sessions that are directed towards designated helpline numbers. In another embodiment, all outgoing or initiated communication sessions are routed through the CAC, and the CAC identifies outbound communication sessions directed to a receiving entity that is associated with customer service or technical support sessions. In either embodiment, the CAC uses attributes or qualities of the outgoing communication session to determine if a given communication session is a customer service or technical support session.

Suitable attributes of the communication session include an identification of the destination, e.g. receiving party phone number or URL, for the communication session. In one embodiment, the CAC identifies the destination, i.e. receiving party, of the communication session and compares the receiving party identification to a pre-determined list of designated help-line or customer service destinations. If the communication session is directed to one of the pre-determined helpline numbers, the CAC identifies the outbound communication session as a help or support session. In one embodiment, in order to establish the pre-determined list of help-line or customer service destinations, the CAC provides for individual computer applications to register, for example using API, help-line or customer service numbers. Alternatively, the CAC contacts a remote service, for example a file-specific web site, a central internet web file or specific corporate web sties, to proactively determine and download help-line or customer service numbers to the list. In another embodiment, the CAC may request a response from a remote service that indicates whether or not the number is associated with a helpline or customer service destination. In this embodiment, the remote service is responsible for providing current knowledge of helpline identifiers. Therefore, the CAC marks particular or pre-determined destination numbers or identifiers as help numbers.

Suitable attributes also include attributes in addition to destination phone numbers or URL's. In one embodiment, attributes or tags are associated with each communication session. These attributes can be provided by the computer application or computing platform from which the communication session originates. In one embodiment, the tag is a variable, for example the need-context variable, that is assigned a value, for example true or false, high or low or yes or no. An example of this variable is "need-context variable=yes", which instructs the CAC that the communication session is to receive contextual data. The tag can be provided in either human-readable format, e.g. expressed in a mark-up language, or in machine-readable format, e.g. expressed in binary form. In addition to telling the CAC that contextual information is needed, other variables are provided that identify the type of contextual data needed. The CAC evaluates the state or value of the attributes associated with each outbound communication session and uses these attribute values to identify an outbound communication session as a help or support session. Having identified a communication session as a help session, the CAC appends relevant contextual data, which can also be determined from the associated attributes, and if desired system registry information to the communication session before passing the communication session through the communication stack. In order to append relevant contextual data, the CAC is in communication with each log containing the contextual data and is capable of identifying relevant information within this log and reading the identified relevant information from the log.

In one embodiment, the communication system or communication stack within the system 10 is a Session Initiation Protocol communication service (SIPCS). As was discussed above, the SIPCS can be provided on each computer computing platform, in each domain containing a plurality of computing platforms or on at least one centralized server, for example a SIP communication server 55. The CAC modifies the SIPCS or works in conjunction with the SIPCS to monitor SIP based communication sessions from an initiating entity to a receiving entity that are used to request assistance regarding a subject application running on one of the systems. In one embodiment, the system includes a plurality of SIP communication servers, for example domain-based servers. Alternatively, a common centralized SIP communication server is provided. In one embodiment where a domain-based or centralized server is used, the SIP communication server is a call forwarding proxy. The SIP communication server is in communication with the systems running the applications and with the context logger server across one or more networks 20, 50. Suitable networks are the same as for the context logger server. In one embodiment, the SIP communication server and the context logger server are integrated into a single server 52.

In general, the CAC component, either existing individually or integrated into the SIPCS is in communication with the context logger service and is capable of reading contextual data stored in the log contained in the database or other storage medium 53. Although illustrated as a SIP-based service, any type of communication or data transfer syntax that is capable of monitoring communication sessions between an initiating entity and a receiving entity 14, of reading application specific contextual data and system registry information from the log and of forwarding the application specific contextual data and system registry information to the receiving entity can be used. In general, the SIPCS facilitates communication sessions between initiating entities and receiving entities, and the CAC monitors or intercepts requests from the initiating entities to initiate a communication session regarding one of the computer applications running on one of the computing platforms, for example the computing platform running the subject application, to a given customer service center 14.

In one embodiment, the CAC utilizes information contained within the communication session request, for example an identification of the computer application, computing platform or call center, to determine what information or data to extract from the log. The CAC retrieves the identified relevant contextual data from the contextual data log and appends these data to the communication session initiation request. The extracted and appended contextual data are delivered by the SIPCS to the call center in conjunction with the communication session initiation request. In one embodiment, the CAC uses the identity of the receiving party or callee, i.e. the intended destination of the communication session initiation request, to determine if the communication session request is to be intercepted and enhanced with contextual information or simply passed through to the receiving entity without enhancement. For example, the SIPCS receives a call request from a subject computer application for a specific SIP URL. The CAC identifies the URL and compares this URL to a pre-determined list of URL's associated with customer service or technical support functions. If the URL associated with the communication session initiation request is on the pre-determined list, the CAC communicates with the contextual data log and retrieves appropriate and relevant contextual data and system registry information for the subject computer application and URL. The CAC obtains the desired contextual data and, if desired, system information, from the log and appends these data to the communication session initiation request as part of the SIP signaling message. The appended data are then displayed on equipment located at the receiving entity, e.g. the call center.

In one embodiment, the CLOGS, CAC and communication protocol stack are contained on each computing platform running the computer applications. Separate CLOGS's, CAC's and communication protocol stacks can be provided for each computer application running on the computing platform, or a CLOGS, CAC and communication stack can be provided for all of the applications running on a given computing platform. The contextual data are logged locally on the computing platform, and each computing platform initiates communication sessions and appends the relevant contextual data from the log to the communication session for delivery to the receiving entity. This is a self-contained embodiment, where the components for logging contextual data, monitoring communication sessions and appending contextual data to communication sessions are contained on each computing platform. In another embodiment, The CLOGS runs on each computing platform and maintains the contextual log on each computing platform. When a communication session is initiated, this local, self-contained contextual log is synchronized with a central contextual log. Therefore, the local, self-contained log is a temporary log. The CAC can be operated locally on the computing platform or at a centralized location in communication with the centralized contextual log. The CAC, in response to the communication session initiation request, retrieves the relevant contextual data from the centralized log and appends these data to the communication session request. In another embodiment, each computing platform is in continuous or regular communication with local domains or local areas networks and wide area networks. In this embodiment, the CLOGS, CAC, communication protocol stack and contextual data log can be operated from a single centralized location as opposed to on each computing platform. In addition, the various components can be resident at separate locations that are in communication across one or more networks. The locations include individual computing platforms, domain servers and centralized servers.

Figure 2:
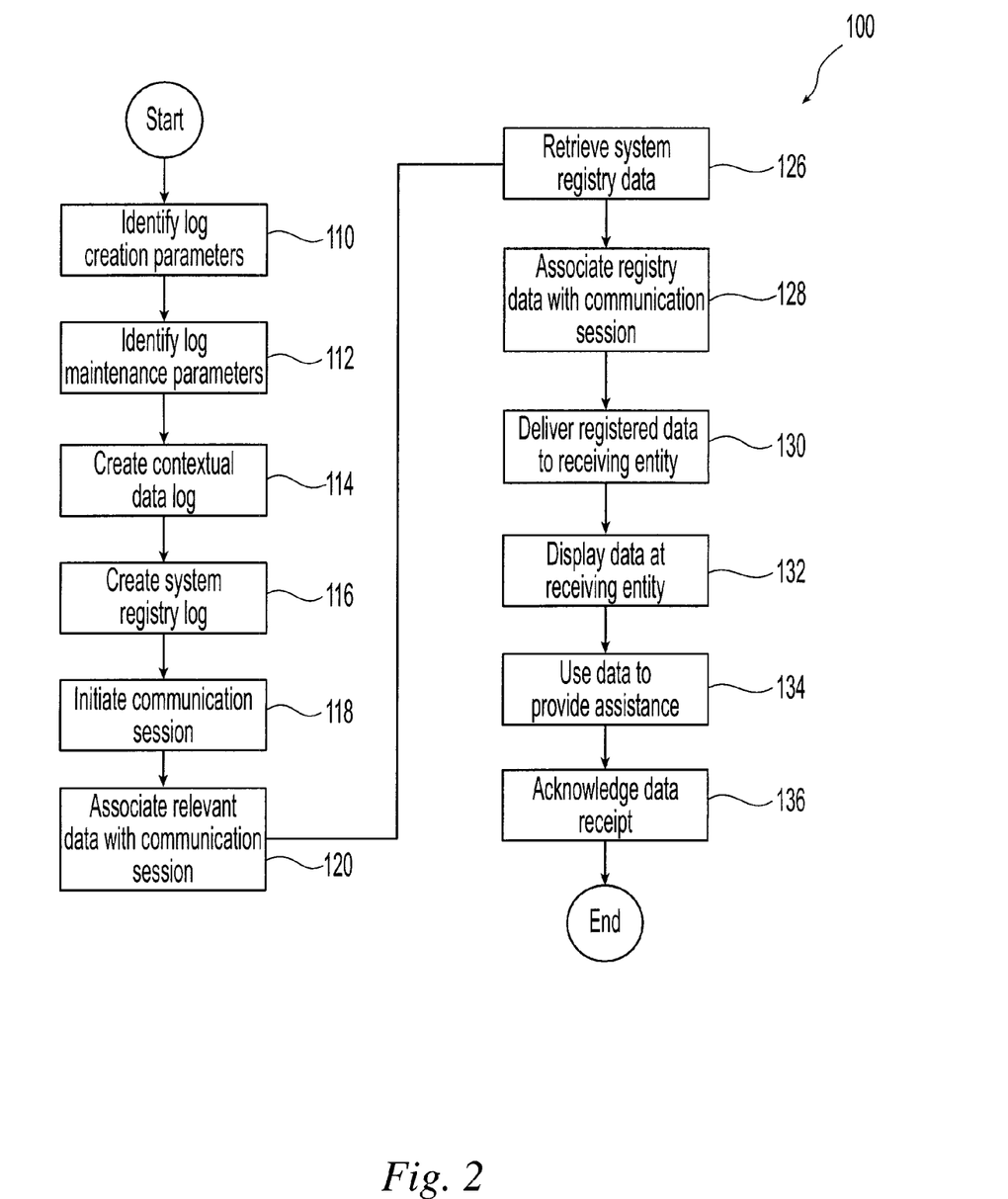
FIG. 2 is a flow chart illustrating an embodiment of a method for associating contextual data with a communication session in accordance with the present invention.

Referring to FIG. 2, an exemplary embodiment of a method 100 for associating contextual data with communication sessions in accordance with the present invention is illustrated. Initially, relevant contextual data for each computer program running on each computing platform for which a contextual data log is desired are identified. This identification of relevant contextual data is embodied as one or more parameters or rules for collecting contextual data. Therefore, log creation parameters or rules are identified 110 that are used in selecting the application specific contextual data to be stored in the log. Suitable methods for identifying the log creation parameters include, but are not limited to, integrating the creation parameters within the computer executable code of each computer application from which contextual data are obtained, integrating the creation parameters as independent computer executable code running on one or more computing platforms, integrating the creation parameters as computer executable code within the context logger service and combinations thereof. In addition, the system can provide for user-defined and inputted creation parameters and for manual addition of data to the log. The creation parameters define the type of information logged, the quantity of information logged, time constraints on when the information is logged or any other suitable parameter.

Having identified parameters for the creation of each log, log maintenance parameters or rules are identified 112 that are used in maintaining or removing application specific contextual data stored in the log. Suitable methods for identifying the log maintenance parameters include, but are not limited to, integrating the maintenance parameters within the computer executable code of each computer application, integrating the maintenance parameters as independent computer executable code running on one or more computing platforms, integrating the maintenance parameters as computer executable code within the context logger service and combinations thereof. In addition, the system can provide for user-defined and inputted maintenance parameters and for manual modification and removal of data from the log. The maintenance parameters define how data are maintained in the log based on factors such as the amount of storage space available, the occurrence of a specified event, for example the log can be erased after every read function or every function that extracts data from the log, the expiration of a specified period of time, the type of information logged, the quantity of information logged, the time of day and combinations thereof.

Having identified the creation and maintenance parameters, at least one log containing application specific contextual data for one or more computer applications is created in accordance with at least one of the pre-defined creation parameters 114 and is maintained in accordance with at least one of the pre-defined maintenance parameters. The log can be created locally on one or more computing platforms running the computer applications, on one or more domain-wide servers or on a single, centralized server in communication with each computing platform across one or more networks.

In one embodiment, a log of application-specific contextual data is created for relevant parameters associated with each one of a plurality of computer applications running on at least one computing platform. Alternatively, a log of application-specific contextual data is created for relevant parameters associated with each one of a plurality of applications running concurrently on a plurality distinct computing platforms. In addition to creating a single log, a plurality of logs can be created up to a number of logs equal to the number of computer applications such that each application has its own log. A separate log can also be created for each computing platform to handle all computer applications associated with that computing platform. In one embodiment, at least one log is created for one application running on one computing platform. As used herein, application-specific contextual data include historical records of actions taken by a specific application, for example a record that a file was accessed by the application within the last 10 minutes, a record of a macro or other routine that was executed by the application within the last two hours or an error message that is received every time a routine is executed. Application-specific contextual data is logged for each computer application. Therefore, the data provide a relevant context in which each application has been operating. This context is used to provide information to a customer service agent that can be used to diagnose and correct problems. The customer does not have to remember this information when placing a support call and does not have to provide this information to be transcribed by the customer service agent.

In one embodiment, the logs are created by a logger application, i.e. the CLOGS, that is independent of the computer applications for which the logs are created. In one embodiment, the logger application is expressed as separate computer executable code that is resident on and executed by centralized servers or servers associated with a given domain or accessible to all computing platforms across one or more networks. In this embodiment, the logger application is in communication with each one of the computer applications, monitors these applications for relevant contextual data, extracts the relevant contextual data and writes the relevant data to the log. In another embodiment, the logger application is provided on each computing platform and in particular within each computer application running on the various computing platforms. In particular, the computer executable code of the computer applications can be modified or constructed to contain the logger application functionality. In one embodiment, the logger application provides each computer application with an API that is used by that application to write the desired relevant contextual information to the log. In one embodiment, a common API is used by all of the computer applications to write the relevant or desired application specific contextual data to the log. Suitable API's are known and available in the art.

Logs of the application specific contextual data can be created in databases or other computer readable storage media that are disposed in any location that is accessible by the computing platforms, the CLOGS and the CAC. In one embodiment, the logs are created in memory locations within the computing platforms running the computer applications for which the logs are being maintained. Other suitable locations for the logs include, but are not limited to, local network servers or domain-specific servers and centralized databases or servers in contact with the applications across one or more networks. Therefore, methods for creating the contextual data log in accordance with exemplary embodiments of the present invention include, but are not limited to, creating an application log, creating a common log, creating a local log, creating a remote log, creating a distributed log, creating a log on portable storage media and combinations thereof. In one embodiment, at least one common log is created in a common location or database that is in communication across one or more networks with each one of the plurality of computing platforms running the computer applications. For example, a single common log is created in a common centralized database in communication with each one of the plurality of computer applications running on the plurality of computing platforms. In another embodiment, multiple logs are created. Any number of logs can be created, for example, one log for each computing platform or one log for each computer application.

In creating the contextual data log, data that are relevant to the operation of each application are written to and saved in the log. Suitable data for the log include, but are not limited to, a list of executed tasks, a list of executed macros, a list of accessed files, a list of application states, a sequence of application states, an identification of the last initiated action, an identification of the last file opened, an identification of the last file closed, an identification of the last file modified, an identification of the last user-initiated action that failed, a list of memory exceptions, an identification of all data accessed, a list of dynamically linked libraries invoked, an identification of web services invoked, an identification of communications with web services, an identification of data received, an identification of data transmitted, an identification of buffer overruns and combinations thereof. The application specific contextual data are stored in a format that is suitable for reading, forwarding and displaying the data. In general, any suitable language or syntax that is capable of being read and understood by the initiating and receiving entities can be used for the log. Examples of suitable languages include, but are not limited to extensible markup language (XML), compressed machine-specific format, an application specific format, computer-readable code, binary code, abbreviations, natural languages, icons, audio signals including Morse code, coded language using, for example, public key infrastructure (PKI), digital signals and combinations thereof.

In addition to contextual data about a given application, information about the computing platforms on which the applications are running can be used to diagnose and to solve technical support issues. Therefore, in one embodiment, a system registry log of system configuration data is created 116 for each computing platform on which an application is running. The system registry log is associated with the computer applications running on a given computing platform and is preferably located at the same location at which the contextual logs for the computer applications are maintained. In one embodiment, a copy of the system registry log is integrated into the application specific contextual log for each application running on that computing platform. The system registry information includes all of the information contained in the system registry including, but not limited to static configuration information, state data and an identification of the operating system including the version of the operating system.

When technical support or any other type of assistance is required by a user of one of the applications, a communication session is initiated 118 between an initiating entity, e.g. that user, and a receiving entity, e.g. the help desk, to request assistance regarding a subject computer application running on a computing platform. Any suitable method can be used to initiate the communication session including placing a voice telephone call using a conventional telephone, placing a telephone call using a VoIP service, sending an E-mail message, initiating an instant messaging (IM) session and combinations thereof. In one embodiment, an integrated computing device that is capable of establishing and conducting the communication session between the initiating entity and the receiving entity is used to initiate the communication session. Suitable integrated computing devices include computers 26, PDA's 51 and smart phones 17 (FIG. 1). In one embodiment, a single location 27 can include a wireline phone 18 connected to the PSTN for initiating a telephone call and a separate computer 26 networked to the internet to conduct the contextual data transfer component of the communication session.

In general, any type of communication session capable of providing at least one-way and preferably two-way exchanges of communication data between two or more entities can be used. Suitable communication sessions include, but are not limited to, synchronous communications, telephone communications including wireline, wireless, cellular, satellite, analogue, digital or VoIP based telephone communications and combinations thereof. Other suitable communication sessions include two-way radio communications and teleconferencing systems including web-based teleconferencing systems. The communication session can be established across any suitable network or combinations of networks including a public switched telephone network (PSTN), local area networks and wide area networks such as the Internet or World Wide Web. In one embodiment, the communication session is a telephone call using a PSTN. In another embodiment, the communication session is a VoIP call using the internet. Suitable control protocols for the VoIP communication session include SIP.

Suitable initiating entities include automated entities and live persons or participants that are capable of initiating the communication session. These initiating entities include, but are not limited to callers, customers, program participants, buyers, students, patients and combinations thereof. In general, the initiating entity initiates or establishes the communication session for the purpose of obtaining the desired assistance from the receiving entity. Although suitable receiving entities include the same types of entities as the initiating entity, typically the receiving entity is a business or institution that provides the requested services.

In one embodiment, the integrated computing device is one of the computing platforms running the applications and in particular the initiating entity computing platform associated with the initiating entity and running the subject application. Suitable methods for using the integrated computing device to initiate the communication session include, but are not limited to, entering a voice command, selecting at least one hardware command, selecting at least one software command and combinations thereof. The communication session can be initiated as a SIP-based communication session, a VoIP-based communication session, a synchronous communication session, an asynchronous communication session and combinations thereof.

Figure 3:
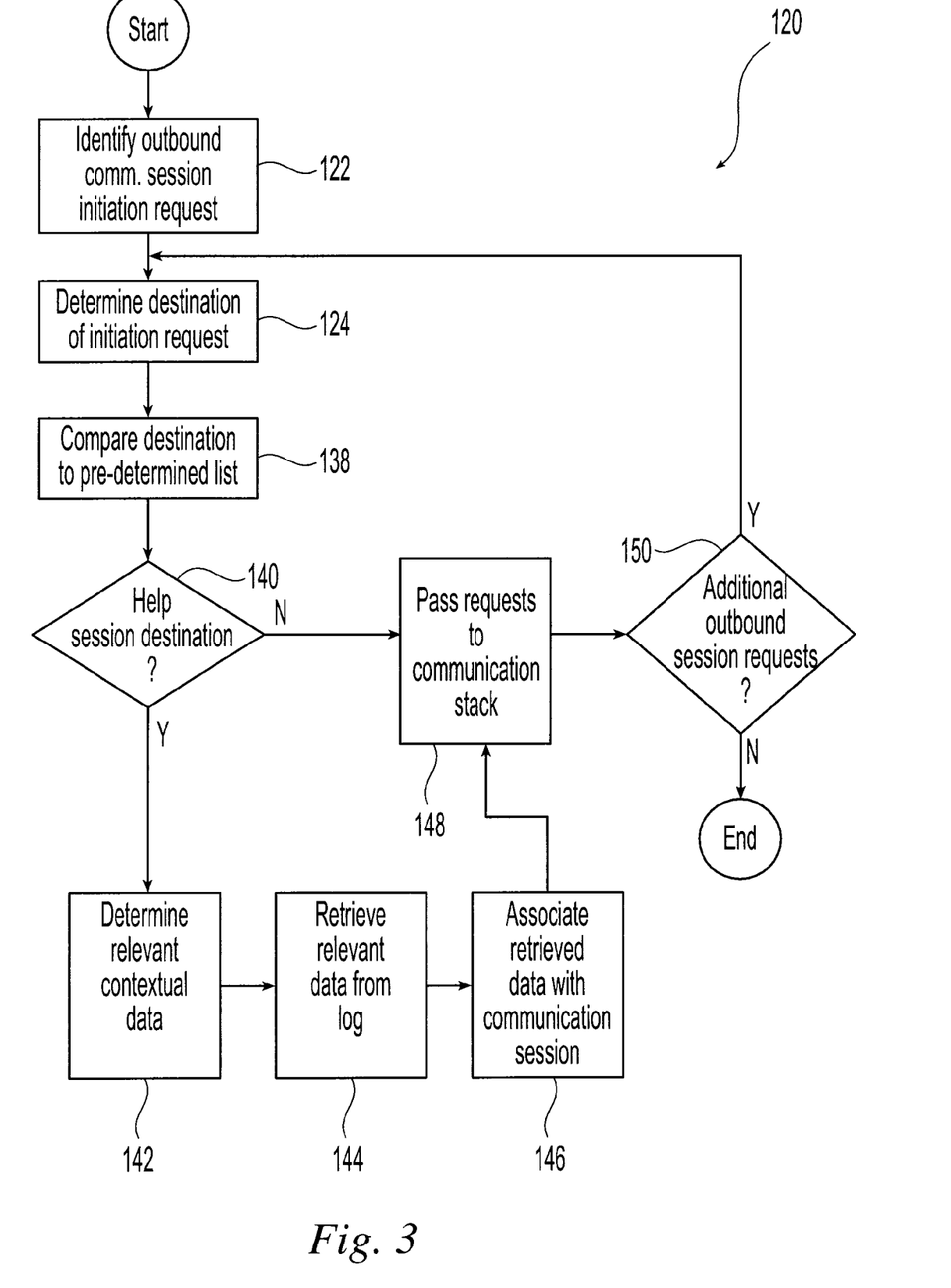
FIG. 3 is a flow chart illustrating an embodiment of the step of associating relevant contextual data.

Upon initiation of a communication session between the initiating entity and the receiving entity for the purposes of obtaining technical support or other customer services, relevant contextual data are associated with that communication session 120. In one embodiment, association of relevant contextual data includes an initial determination as to whether this communication session is to be enhanced with relevant contextual information, i.e. is a customer service call and an identification of the relevant contextual data. In one embodiment for associating the relevant contextual data with the communication session 120 as illustrated in FIG. 3, an outbound communication session initiation request is identified 122. Preferably, the outbound communication session initiation request is identified using the CAC. In one embodiment, all communication sessions are routed through the CAC. In another embodiment, the CAC monitors the computing platforms for communication sessions, identifies communication session initiation requests and intercepts the communication session initiation request. Having identified the communication initiation request, a determination is made as to the destination of the initiation request 124. In one embodiment, this determination is made using an implicit policy based on the called and calling network identifiers, for example phone numbers, SIP URL's or IM identifiers. The identified destination is compared to the destinations contained in a predetermined list of customer service or technical support destinations 138. This list is populated through methods as described above.

Based on this comparison, a determination is made if the identified destination is a help desk destination 140, i.e. if the identified destination is contained in the pre-determined list of destinations. If the identified destination is not a help session destination, the communication session initiation request is passed unaltered through the communication stack 148. If the identified destination is a help session destination, then the relevant data to be associated with the communication session are determined 142. Factors used in determining the relevant contextual data include, but are not limited to, an identification of the subject application, time of day, an initiating entity uniform resource locator, a receiving entity uniform resource locator, error messages, an identification of hardware buttons selected to initiate the communication session, an identification of voice commands used to initiate the communication session, an identification of software buttons used to initiate the communication session and combinations thereof. After the relevant data have been identified, these data are retrieved from the data log 144. Suitable methods for reading and obtaining data from the log include any method known and available in the art for reading and writing information from a database.

The retrieved data are then associated with the communication session 146. In one embodiment, the relevant data are transmitted to the receiving entity substantially concurrently with the communication session data or signaling messages. Alternatively, the relevant data are transmitted to the receiving entity independent of the communication session data or signaling messages, for example in advance of the establishment of the communication session. In one embodiment, the relevant data are transmitted to the receiving entity using a single device that is capable of both transmitting the processing criteria and establishing the communication session or using separate devices for transmitting the relevant data and conducting the communication session. In one embodiment, the communication session is a SIP-based communication session, and the application specific contextual data is associated with the communication session by appending a SIP message from the initiating entity to the receiving entity to include the relevant portions of the application specific contextual data. Suitable methods for forwarding data with session initiation protocol communications are disclosed in U.S. patent application Ser. No. 11/031,927, filed Jan. 8, 2005, which is incorporated herein by reference in its entirety.

In one embodiment, the CAC determines that the communication session is to be enhanced with additional contextual criteria, and the CAC retrieves at least a portion of the application specific contextual data contained in the log and related to the subject application and then associates these data with the communication session.

Having identified and retrieved the relevant contextual data and associated these data with the communication session, the communication session initiation request is forwarded to the communication stack for delivery to the receiving entity 148. The system this checks for additional outbound communication session requests 150. If additional requests are detected, then the system again looks at the destination of the initiation request.

Figure 4:
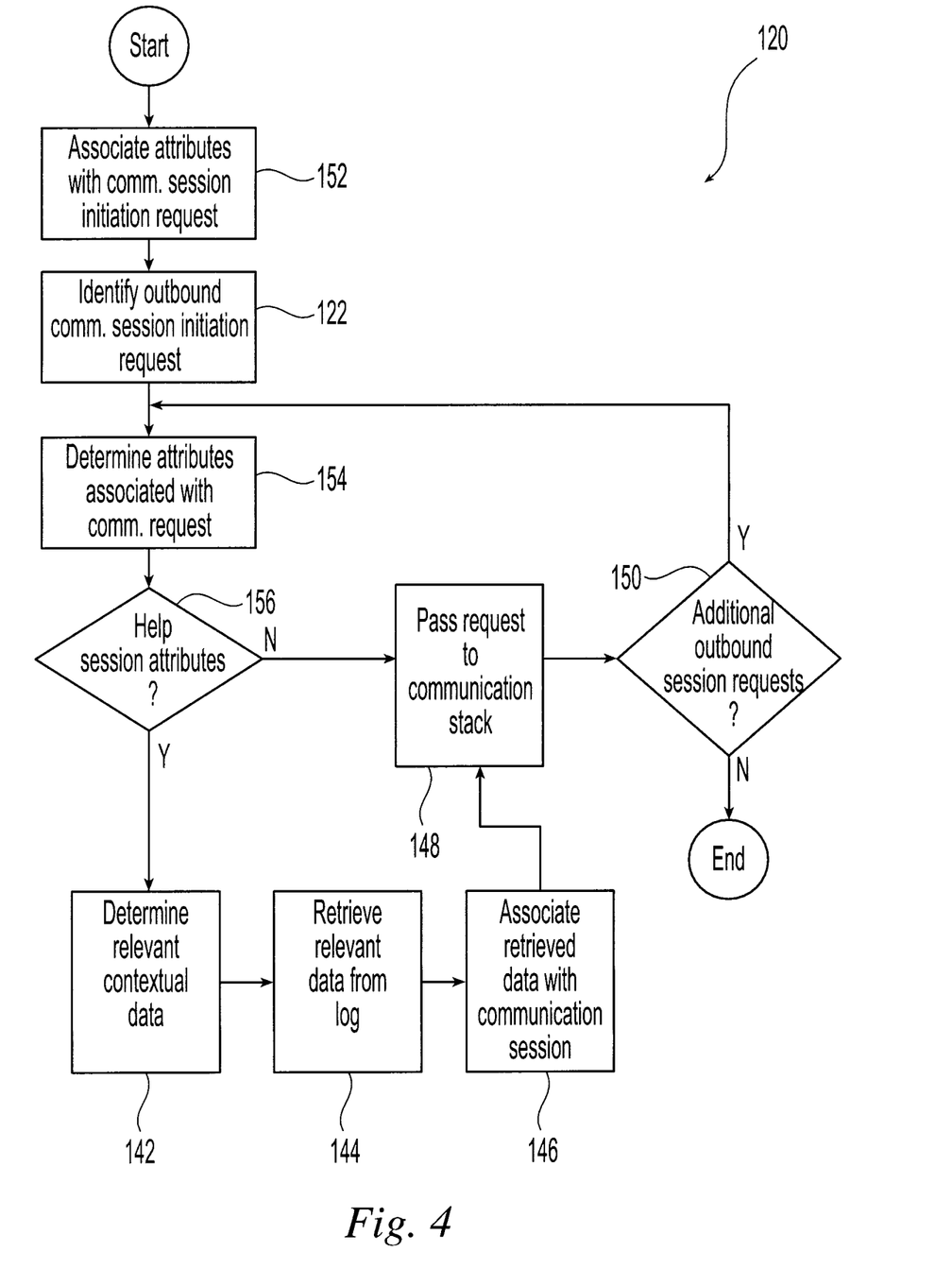
FIG. 4 is a flow chart illustrating another embodiment of the step of associating relevant contextual data.

In another embodiment as illustrated in FIG. 4, the step of associating relevant data with a communication session 120 utilizes other attributes associated with the communication session to determine if the communication session is a help desk or support call communication session that requires contextual data to be associated with the communication session. Initially, attributes are associated with the communication session initiation request 152. Suitable attributes include, but are not limited to, the time of day, the level of trust associated with particular groups of identifiers, e.g. transmit the additional contextual information if the destination URL is within the same organizational domain, or the priority level associated with the call request and additional attributes implicitly or explicitly associated with the call request, e.g. a call made from a configuration-related web page or a call made by an individual with a "premier customer" identification. In one embodiment, the configuration and association of suitable policies is performed on the CAC component associated with call routing and is performed using customizable rule sets or API's provided by an implementation of the CAC. In one embodiment, each application is authored to implicitly associate the appropriate triggering conditions, i.e. conditions that cause the CAC to retrieve and transmit the relevant contextual information, with various application-specific features, such as icons, e.g. a "Live Help" icon on the application panel.

The system identifies outbound communication session initiation requests 122 using methods as discussed above, and determines the attributes that have been associated with the communication session initiation request 154. The identified attributes are evaluated to determine if the attributes are help session attributes 156. In one embodiment, this evaluation is conducted by determining the value of the attribute. For example, the attribute can be a variable that if assigned a value of "true", then contextual data are required. In another embodiment, the attributes are compared to the attributes contained in a pre-determined list of attributes associated with customer service or technical support sessions. This list is populated through methods as described above.

Based on the attribute evaluation, the system determines if the communication session is a help session. If the communication session is not a help session, the system passes the communication session initiation request unaltered through the communication stack 148. If the identified destination is a help session destination, then the relevant data to be associated with the communication session are determined 142. Factors used in determining the relevant contextual data include, but are not limited to, an identification of the subject application, time of day, an initiating entity URL, a receiving entity URL, error messages, an identification of hardware buttons selected to initiate the communication session, an identification of voice commands used to initiate the communication session, an identification of software buttons used to initiate the communication session and combinations thereof. After the relevant data have been identified, these data are retrieved from the data log 144. Suitable methods for reading and obtaining data from the log include any method known and available in the art for reading and writing information from a database.

The retrieved data are then associated with the communication session 146. In one embodiment, the relevant data are transmitted to the receiving entity substantially concurrently with the communication session data or signaling messages. Alternatively, the relevant data are transmitted to the receiving entity independent of the communication session data or signaling messages, for example in advance of the establishment of the communication session. In one embodiment, the relevant data are transmitted to the receiving entity using a single device that is capable of both transmitting the processing criteria and establishing the communication session or using separate devices for transmitting the relevant data and conducting the communication session. In one embodiment, the communication session is a SIP-based communication session, and the application specific contextual data is associated with the communication session by appending a SIP message from the initiating entity to the receiving entity to include the relevant portions of the application specific contextual data. Suitable methods for forwarding data with session initiation protocol communications are disclosed in U.S. patent application Ser. No. 11/031,927, filed Jan. 8, 2005, which is incorporated herein by reference in its entirety.

Having identified and retrieved the relevant contextual data and associated these data with the communication session, the communication session initiation request is forwarded to the communication stack for delivery to the receiving entity 148. The system this checks for additional outbound communication session requests 150. If additional requests are detected, then the system again looks at the destination of the initiation request.

In the previous embodiments, the identification and association of relevant data are conducted as an intercept-and-append operation. In accordance with these embodiments, a third party service or server, for example the CAC, monitors communication traffic between the computing platforms or computer applications and the customer service centers. When a communication session initiation request is detected, the third-party server intercepts the message, determines the relevant data, retrieves the relevant data from the log, appends the relevant data to the communication session initiation request and releases the communication session initiation request for delivery to the receiving entity. Alternatively, the third party server is operated in a passive mode where it does not actively monitor communication traffic, and all traffic is routed to the third-party server for processing including communication session initiation requests.

Figure 5:
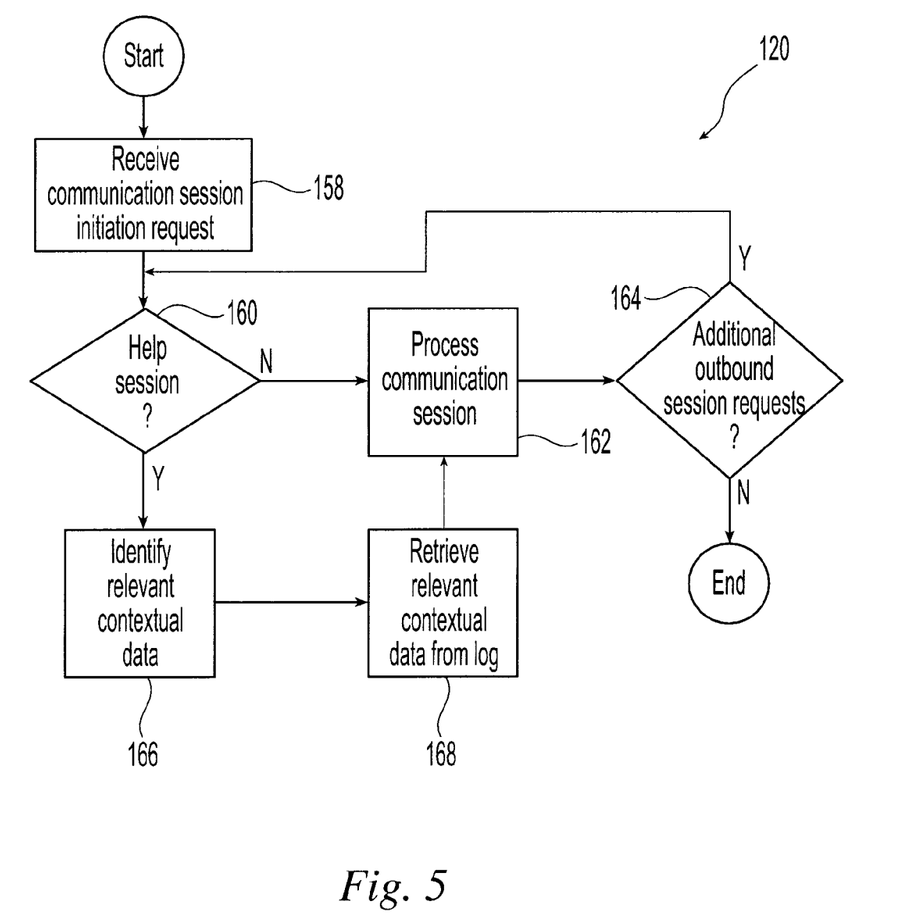
FIG. 5 is a flow chart illustrating another embodiment of the step of associating relevant contextual data.

In another embodiment, associating of the relevant data is handled as a receive-and-retrieve operation as illustrated, for example, in FIG. 5. The receiving entity receives the communication session initiation request from the initiating entity 158. The receiving entity, upon receipt, determines whether or not the communication session initiation request is a help session 160. If the communication session initiation request is not associated with a help session, then the communication session is simply processed in accordance with the initiation request 162. If the communication session initiation request is associated with a help session, the receiving entity identifies the relevant application specific contextual data 166, contacts the log and retrieves the relevant data from the log 168. The communication session is then processed in conjunction with the retrieved contextual data 162. The receiving entity then monitors for additional communication session initiation requests 164. Suitable methods for identifying the communication session initiation request as a help session in accordance with this embodiment are the same as for the other embodiments discussed above and include identifying the destination or attributes associated with the communication session initiation request.

Returning to FIG. 1, in an embodiment where system registry data are also needed or desired during the processing of the communication session, at least a portion of the system configuration data contained in the system registry log and related to the system in which the subject application is running is retrieved 126. The retrieved data are associated with the communication session 128. Suitable methods for determining the relevant system registry data, retrieving the data and associating the data with the communication session are the same as the methods used in the various embodiments for associating the application specific contextual data, including intercept-and-append and receive-and-retrieve arrangements.

In one embodiment, the system registry data associated with the communication session along with the relevant application specific contextual data are delivered to the receiving entity 130. The associated application specific data and system registry information are displayed at the receiving entity 132, for example in a user-readable format. Methods for displaying the data include displaying the data on a computer system 34 or other suitable device at the agent desk. The delivered and displayed application specific contextual data and system registry information are used by the help desk agent to provide the requested assistance 134. In one embodiment, an acknowledgement message is sent from the receiving entity to the initiating entity indicating that the associated application specific data and any system registry data were received 136. The application-specific contextual data transmitted to the receiving entity is used by the receiving entity, in particular to assist in providing the help or services requested by the initiating entity. The use of the transmitted data can be specific to a given communication session or can be used for more than one session. For example, in one embodiment, a historical log of application specific contextual data received at the receiving entity is created and analyzed for patterns in the application specific contextual data received at the receiving entity over time. Any identified patterns in the transmitted data are used to improve assistance provided by the receiving entity.

The relevant application-specific contextual data may be used not only to improve the displayed content at the receiving entity but to alter or affect the processing of one or more business processes at the receiving entity. The business processes include, but are not limited to, actions such as the automatic retrieval of repair programs or instruction guides at the receiving end and the subsequent transmission of these programs and guides to the originating entity as well as insertion of the contextual data into data analysis and correlation engines, e.g. to detect patterns in the help requests of different individual requesters, or the generation of additional communication messages to other third parties or entities, e.g. the automatic generation of alerts to a help desk monitor tool that is trying to determine the number of help requests that arrive for a "printer misconfiguration" error.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for associating contextual data with communication sessions in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for associating contextual data with a communication session, the method comprising:
    creating a log of application specific contextual data for a computer software application executing on a computing platform, the application specific contextual data comprising a historical record of actions taken by the computer software application when executing on the computing platform, the historical record required to diagnose and solve technical problems associated with execution of the computer software application;
    initiating a communication session between an initiating entity and a receiving entity to request assistance in solving one of the technical problems associated with the execution of the computer application by sending a communication session request to the receiving entity, the receiving entity comprising a plurality agents;
    associating at least a portion of the application specific contextual data contained in the log and related to the computer application with the communication session request;
    transmitting the associated contextual data to the receiving entity automatically and concurrently with a time when the communication session is initiated; and
    using the transmitted application specific contextual data to route the communication session to a given agent based upon expertise and to diagnose and solve the technical problem.

2. The method of claim 1, wherein the step of creating a log comprises at least one of creating an application log, creating a common log, creating a local log, creating a remote log, creating a distributed log, creating a log on portable storage media and combinations thereof.

3. The method of claim 1, wherein the step of creating a log comprises creating a log in a memory location contained in the computing platform running the computer application.

4. The method of claim 1, wherein the step of creating a log comprises creating a log in at least one common database in communication with the computer application across one or more networks.

5. The method of claim 1, wherein the step of creating the log further comprises creating a log of application specific contextual data from a plurality of computer applications running on the computing platform.

6. The method of claim 1, wherein the step of creating a log of application specific contextual data further comprises creating a log comprising at least one of a list of executed tasks, a list of executed macros, a list of accessed files, a list of application states, a sequence of application states, an identification of the last initiated action, an identification of the last file opened, an identification of the last file closed, an identification of the last file modified, an identification of the last user-initiated action that failed, a list of memory exceptions, an identification of all data accessed, a list of dynamically linked libraries invoked, an identification of web services invoked, an identification of communications with web services, an identification of data received, an identification of data transmitted, an identification of buffer overruns and combinations thereof.

7. The method of claim 1, wherein the step of creating a log of application specific contextual data further comprises creating the log in accordance with at least one pre-defined creation parameter.

8. The method of claim 1, further comprising maintaining the application specific contextual data in the log in accordance with at least one pre-defined maintenance parameter.

9. The method of claim 8, wherein the pre-defined maintenance parameter comprises at least one of the amount of storage space available, the occurrence of a specified event, the expiration of a specified period of time and combinations thereof.

10. The method of claim 1, further comprising:
    creating a system registry log comprising system configuration data for the computing platform running the computer application;
    associating at least a portion of the system configuration data contained in the system registry log with the communication session;
    transmitting the associated system configuration data to the receiving entity; and
    using the transmitted system configuration data to improve assistance provided by the receiving entity.

11. The method of claim 1, wherein the step of creating a log of application specific contextual data comprises using a common application program interface to write the application specific contextual data to the log.

12. The method of claim 1, wherein the step of creating the log comprises creating the log in extensible markup language, compressed machine-specific format, an application specific format or combinations thereof.

13. The method of claim 1, wherein the step of initiating a communication session further comprises using an integrated computing device that is capable of establishing and conducting the communication session between the initiating entity and the receiving entity to initiate the communication session.

14. The method of claim 13, wherein the integrated computing device comprises the computing platform running the computer application for which assistance is requested.

15. The method of claim 1, wherein the step of initiating a communication session comprises initiating a session initiation protocol based communication session, a voice over internet protocol based communication session, a synchronous communication session, an asynchronous communication session or combinations thereof.

16. The method of claim 1, wherein the step of associating at least a portion of the application specific contextual data further comprises:
identifying that the initiated communication session is to request assistance regarding the computer application;
determining relevant contextual data contained within the log to be associated with the communication session;
retrieving the relevant contextual data from the log; and
associating the retrieved relevant contextual with the communication session.

17. The method of claim 16, wherein the step of identifying the initiation communication session further comprises:
identifying a destination for the communication session; and
using the destination to identify that the communication session is to request assistance regarding the computer application.

18. The method of claim 16, wherein the step of identifying the initiation communication session further comprises:
identifying at least one attribute associated with the communication session; and
using the identified attribute to identify that the communication session is to request assistance regarding the computer application.

19. The method of claim 16, wherein the communication session is a session initiation protocol based communication session and the step of associating the portion of the application specific contextual data further comprises appending a session initiation protocol message from the initiating entity to the receiving entity to include the portion of the application specific contextual data.

20. The method of claim 1, wherein the step of using the associated application specific contextual data comprises displaying information responsive to the associated application specific data at the receiving entity in a user-readable format.

21. The method of claim 1, wherein the step of using the associated application specific contextual data comprises creating a historical log of application specific contextual data received at the receiving entity, analyzing the historical log for patterns in the application specific contextual data received at the receiving entity over time and using identified patterns in the application specific contextual data to improve assistance provided by the receiving entity.

22. The method of claim 1, further comprising sending an acknowledgement message from the receiving entity to the initiating entity indicating that the associated application specific data were received.

23. A method for associating contextual data with a communication session, the method comprising:
creating a log of application specific contextual data for a plurality of software applications executing on a plurality of distinct computing platforms, the application specific contextual data comprising a historical record of actions taken by the computer software applications when executing on the computing platforms, the historical record required to diagnose and solve technical problems association with execution of the software applications and the log created in a common database that is in communication with each one of the computing platforms across one or more networks;
using an integrated computing device to initiate a communication session between an initiating entity and a receiving entity to request assistance regarding one of the technical problems associated with one of the plurality of applications running on one of the computing platforms by sending a communication session request to the receiving entity, the receiving entity comprising a plurality of agents;
identifying a portion of the application specific contextual data in the log to be associated with the communication session request;
obtaining the identified portion of the application specific contextual data from the log;
associating the identified portion of the application specific contextual data with the communication session request automatically and concurrently with a time when the communication session is initiated; and
using the transmitted application specific contextual data to route the communication session to a given agent based upon expertise and to diagnose and solve the technical problem and to improve assistance provided by the receiving entity.

24. The method of claim 23, wherein the communication session comprises a session initiation protocol based communication session and the step of associating the portion of the application specific contextual data further comprises appending a session initiation protocol message from the initiating entity to the receiving entity to include the identified portion of the application specific contextual data.

25. A non-transitory computer-readable medium containing a computer-readable code that when read by a computer causes the computer to perform a method for associating contextual data with a communication session, the method comprising:
creating a log of application specific contextual data for a computer software application executing on a computing platform, the application specific contextual data comprising a historical record of actions taken by the computer software application when executing on the computing platform, the historical record required to diagnose and solve technical problems associated with execution of the computer software application;
initiating a communication session between an initiating entity and a receiving entity to request assistance in solving one of the technical problems associated with the execution of the computer application by sending a communication session request to the receiving entity, the receiving entity comprising a plurality agents;
associating at least a portion of the application specific contextual data contained in the log and related to the computer application with the communication session request;
transmitting the associated contextual data to the receiving entity automatically and concurrently with a time when the communication session is initiated; and
using the transmitted application specific contextual data to route the communication session to a given agent based upon expertise and to diagnose and solve the technical problem.

26. The non-transitory computer readable medium of claim 25, wherein the step of creating a log comprises creating a log in a memory location contained in the computing platform running the computer application.

27. The non-transitory computer readable medium of claim 25, wherein the step of creating a log comprises creating a log in at least one common database in communication with the computer application across one or more networks.

28. The non-transitory computer readable medium of claim 25, wherein the step of creating a log of application specific contextual data comprises using a common application program interface to write the application specific contextual data to the log.

29. The non-transitory computer readable medium of 25, wherein the step of initiating a communication session further comprises using an integrated computing device that is capable of establishing and conducting the communication session between the initiating entity and the receiving entity to initiate the communication session.

30. The non-transitory computer readable medium of claim 29, wherein the integrated computing device comprises the computing platform running the computer application.

31. The non-transitory computer readable medium of claim 25, wherein the step of associating at least a portion of the application specific contextual data further comprises:
   identifying that the initiated communication session is to request assistance regarding the computer application;
   determining relevant contextual data contained within the log to be associated with the communication session;
   retrieving the relevant contextual data from the log; and
   associating the retrieved relevant contextual with the communication session.

32. The non-transitory computer readable medium of claim 31, wherein the step of identifying the initiation communication session further comprises:
   identifying a destination for the communication session; and
   using the destination to identify that the communication session is to request assistance regarding the computer application.

33. The non-transitory computer readable medium of claim 31, wherein the step of identifying the initiation communication session further comprises:
   identifying at least one attribute associated with the communication session; and
   using the identified attribute to identify that the communication session is to request assistance regarding the computer application.

34. A system for associating contextual data with a communication session, the system comprising:
   a context logger server comprising a memory for storage of program instructions for running a context logger service in communication with a plurality of software applications running on a computing platform, the context logger service comprising:
      at least one log capable of storing application specific contextual data for each one of the plurality of applications, the application specific contextual data comprising a historical record of actions taken by the computer software application when executing on the computing platform, the historical record required to diagnose and solve technical problems associated with the plurality of software applications; and
      a common application program interface to facilitate the writing of the contextual data to the log by each one of the plurality of applications; and
   a session initiation protocol communication server to monitor session initiation protocol based communication session requests from an initiating entity to a receiving entity comprising a plurality of agents that are used to request assistance regarding one of the technical problems associated with a subject application running on the system, the session initiation protocol communication server in communication with the context logger service and capable of automatically reading contextual data stored in the log and associating the contextual data with the communication session request at a time when the communication session is initiated to facilitate routing the communication session request to a given agent based on the contextual data.

35. The system of claim 34, wherein the context logger server further comprises a centrally located common server in communication across one or more networks with the plurality of applications running on the computing platform.

* * * * *